United States Patent [19]
Welker

[11] 3,904,176

[45] Sept. 9, 1975

[54] PIVOT VALVE

[76] Inventor: Robert H. Welker, P.O. Box 1228, Bellaire, Tex. 77401

[22] Filed: Jan. 5, 1973

[21] Appl. No.: 321,349

[52] U.S. Cl............. 251/339; 251/303; 251/335 A
[51] Int. Cl............................................ F16k 1/16
[58] Field of Search ............ 251/339, 346, 351, 87, 251/335 A, 303

[56] References Cited
UNITED STATES PATENTS

| | | | |
|---|---|---|---|
| 2,710,594 | 6/1955 | Thompson | 251/339 X |
| 2,785,881 | 3/1957 | Dolan | 251/339 X |
| 3,054,618 | 9/1962 | Abrams et al. | 251/339 X |
| 3,221,769 | 12/1965 | Kiessling | 251/303 X |
| 3,348,566 | 10/1967 | Varis | 251/357 X |
| 3,419,249 | 12/1968 | Noyack et al. | 251/339 |
| 3,438,610 | 4/1969 | Hug | 251/303 |
| 3,463,452 | 8/1969 | Nilsen et al. | 251/339 |

Primary Examiner—Henry T. Klinksiek
Attorney, Agent, or Firm—Donald Gunn

[57] ABSTRACT

A valve which includes a lever which pivots about a particular point and which extends into a deformable resilient diaphragm held adjacent to a backing member. Fluid is introduced on one side of the resilient member while the outlet of the valve is on the opposite side of the resilient member. The resilient member is deformed as the lever is pivoted and forms an opening permitting fluid to escape or pass through the resilient member. When the control rod is in its central position, the resilient member fits snuggly against it to close the valve.

13 Claims, 5 Drawing Figures

PATENTED SEP 9 1975  3,904,176
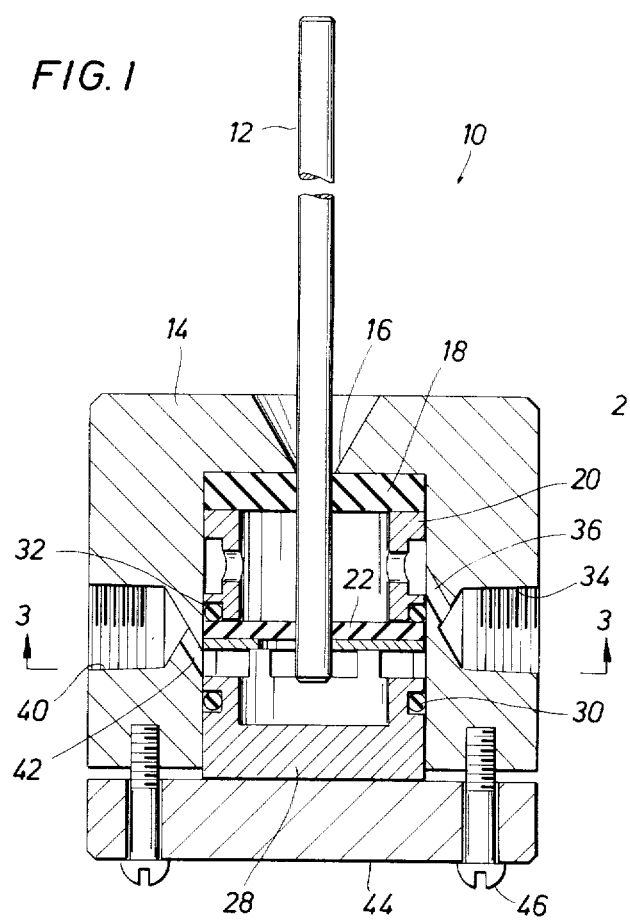
FIG. 1
FIG. 2
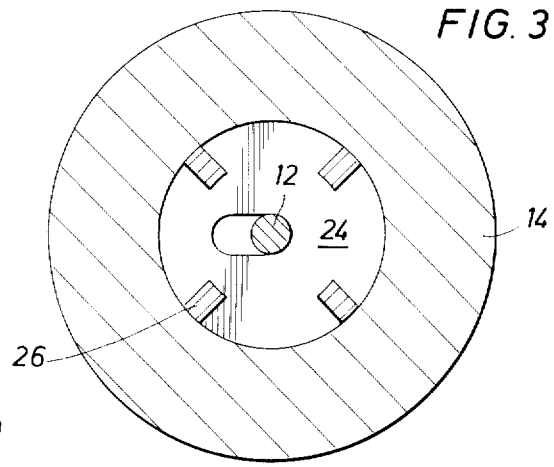
FIG. 3
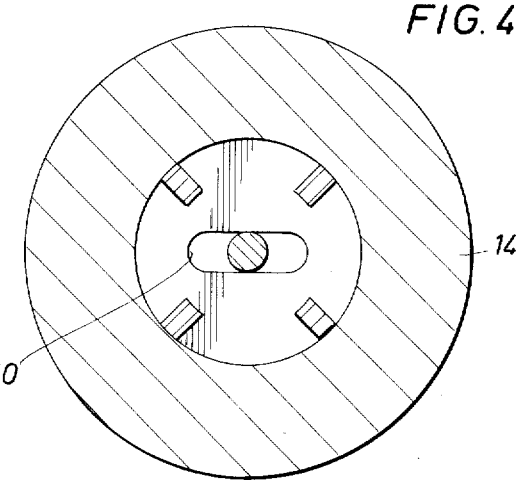
FIG. 4
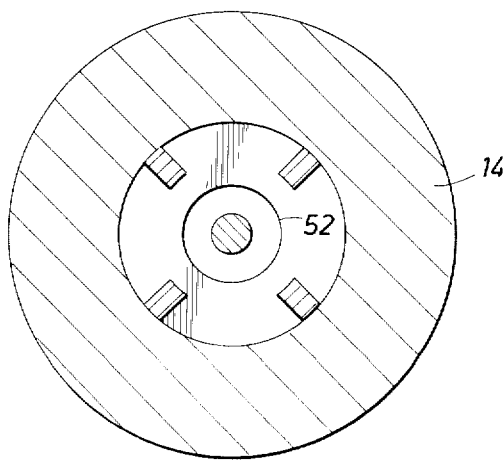
FIG. 5

3,904,176

PIVOT VALVE

PRIOR ART

U.S. Pat. No. 612,570
U.S. Pat. No. 2,271,715
U.S. Pat. No. 2,334,032
U.S. Pat. No. 2,615,597
U.S. Pat. No. 3,097,613

BACKGROUND OF THE INVENTION

The present invention is directed to a valve which has a rod which can be manipulated from a central, at-rest position to a deflected position, and a means of actuating the valve. This, of course, is to be contrasted with valves which use rotating stems. Quite often, it is necessary to install a valve cooperative with operator equipment which provides motion other than rotary motion which is best adapted for stem operated valves. For instance, the motion may be linear. It may be desirable to convert the linear motion into the degree of opening requisite for a particular valve. It is with this application in mind that the valve of the present invention is provided.

SUMMARY OF THE INVENTION

The valve of the present invention is directed to a control valve having a control rod which extends from the valve structure wherein the position of the rod is converted into a degree of valve opening. The valve can be used as a control valve in hydraulic systems. To accomplish these purposes, a shell or housing has a tapered opening which receives the control rod at an encircling lip which snuggly holds the rod in position. The opening is sealed by means of a resilient member which spans an internal chamber. The resilient member fits snuggly about the control rod to prevent leakage along the rod. A first chamber is defined where fluid under pressure is introduced. A second chamber adjacent to the first is also defined. The two chambers are separated by a rigid backing member and a resilient member. The rod extends through both through appropriate openings therein. The second resilient member fits snuggly about the control rod and is clamped about its outer periphery to hold it in position. In the neutral position, fluid does not flow from the first to the second chamber. The second chamber of course is connected to an outlet passage. When the control rod is actuated, it pivots about its point of entry into the first chamber and distorts the second resilient member, forming an opening which permits fluid to flow into the second chamber and out of the valve.

BRIEF DESCRIPTION OF THE DRAWINGS

FIG. 1 is a sectional view through the control valve of the present invention;

FIG. 2 is a view similar to FIG. 1 showing the control rod in a deflected position, thereby controllably opening the valve to fluid flow;

FIG. 3 is a sectional view along the line 3—3 of FIG. 1 showing a first embodiment of the backing plate which limits the direction of actuation of the control rod to a single direction;

FIG. 4 shows an alternative backing plate which limits the control rod to two directions of deflection; and FIG. 5 is a view of an alternative backing plate where the backing plate does not limit the control rod in deflection.

DESCRIPTION OF THE PREFERRED EMBODIMENTS

Attention is first directed to FIG. 1 where a control valve 10 has a pivot rod 12 extending from a body or housing 14. The body or housing has a tapered opening at 16. The opening 16 tapers so as to define the outer limits of deflection of the rod 12 within the opening 16.

The body 14 is of substantial thickenss to define a vessel for handling high pressures which are introduced into it. The opening 16 is formed in a relatively thick wall portion of the hollow body 14 to define a peripheral lip or edge which centers the rod 12. The hole 16 tapers outwardly to an enlarged opening at its outer edge. This defines a chamber where the rod 12 is moved from the illustrated vertical position.

The numeral 18 identifies a diaphragm formed of resilient material of specified thickness which spans an inner chamber within the valve body 14. The diaphragm extends fully across the chamber. it is clamped in position by an encircling collar 20 which presses against the bottom face of the diaphragm 18. The collar 20 serves as a clamp to secure the diaphragm 18 into position. It will be observed that the small diameter neck in the hole 16 need not firmly clamp the rod 12. Slight clearance in the range of a few thousandths of an inch is acceptable. However, the diaphragm 18 fits snuggly about the rod and indeed, an interference fit is preferable. When the diaphragm 18 is clamped in the illustrated position, leakage around the side walls and on the back side of the diaphragm 18 is prevented by upward force exerted on the diaphragm and collar 20. The snug fit of the diaphram around the rod prevents leakage along the rod even though the rod may deflect and distort the diaphragm from its shape in FIG. 1.

The body 14 is preferably formed with a central axial passage or cavity which receives the diaphragm 18 and the collar 20. A second diaphragm spans the chamber or passage and is indicated by the numeral 22. The diaphragm 22 is supported by a transversely extending metal disc 24 better illustrated in FIG. 3. The disc 24 is supported by four upstanding support posts 26 which extend upwardly from a closure member 28. The closure member 28 spans the cavity within the body 14 and is sealed against leakage along the side by means of an O-ring 30. In like manner, an O-ring 32 prevents leakage past the diaphragm 22.

The valve is fabricated with an inlet port at 34. The port 34 introduces fluid above the diaphragm 22. The fluid enters through the port 34 and a small passage 36 to the first cavity where it flows on the exterior of the spacer collar 20. Three or four lateral ports are drilled in the spacer 20 to introduce fluid through the top side of the diaphragm 22.

The numeral 40 identifies an outlet port which communicates with a passage 42 which opens into the cavity below the diaphragm 22. The passage 42 opens between the upstanding supports 26 previously mentioned. Thus, the diaphragm 22 defines a pair of chambers, one above and the other below, which are connected through suitable passages and ports enabling the valve 10 to be connected in a hydraulic system. The valve is completed by placing a cap 44 over the cavity or opening in the body 14 and snuggly securing the cap through the use of bolts 46 to apply a force to the closure member 28 thereby fixing all the components within the body 14 in the illustrated manner. The force creates seals where the diaphragm 18 and 22 engage the circular spacer 20 and the backing member 24.

Operation of the device should be considered. FIG. 2 shows the control rod 12 deflected. When the control rod 12 is deflected, it pivots about the opening 16. The diaphragm 18 gives and distorts slightly but continues to maintain sealing contact about the rod 12. However, the diaphragm 22 does not function in this manner. It is preferably somewhat thinner. The rod 12 pivots at a point causing fairly substantial pulling on the diaphragm 22. The central opening formed in the diaphragm 22 distorts and enlarges, thereby communicating the upper and lower chambers within the valves with one another. This distortion enables fluid communication through the valve.

The metal backing member 24 which is adjacent to the diaphragm 22 prevents extrusion or sagging of the diaphragm 22 in response to the pressure differential which may act across the valve. It also prevents the diaphragm 22 from pulling lose around its periphery.

The backing member 24 can be altered in form or shape. The embodiment shown in FIG. 3 enables the control rod to move in a single direction from its neutral position in FIG. 1. Thus, the metal backing member 24 includes a central opening which is shaped to limit movement of the rod. FIG. 4 shows a similar backing member with a central opening 50, shaped to limit movement of the rod in a single direction but on both sides of center. The embodiment of FIG. 3 permits deflection of the rod 12 in a single radial direction from the central position. The embodiment of FIG. 4 permits movement of the control rod both sides of the neutral position along the same radial but on both sides of the neutral position.

Attention is next directed to FIG. 5 of the drawings where the central opening 52 is illustrated. The opening 52 enables movement of the rod in any direction radially from the neutral position.

The diameter of the holes 50 and 52 formed in the reinforcing or backing members controls the length of stroke permitted to the control rod. The control valve is described to this juncture enables cooperative equipment of most any sort to convert linear motion or movement in the manipulation of the control valve and is to be contrasted with rotary motion is often used with stem operated valves.

The foregoing is directed to the preferred embodiment of the present invention, the scope of which is determined by the claims which are appended hereto.

I claim:

1. A control valve comprising:
   a valve body having an internal cavity of specified size therein;
   inlet and outlet passages through said body in communication with said cavity;
   a diaphragm of sheet material of sufficient width to extend across said cavity to divide said cavity into two portions between said inlet and outlet passages;
   a rod extending into said cavity and into an opening formed in said diaphragm, said opening fitting snuggly about said rod when said rod is in a first position to prevent fluid communication between the portions of said cavity and being distorted on manipulation of said rod to a second position whereupon the opening in said diaphragm communicated said inlet with said outlet when said rod is in the second position;
   a second diaphragm having an opening therein and closing said cavity at the point of entry of said rod; and,
   means pivotally supporting said rod at a pivot positioned to permit pivoting movement of said rod between said first and second positions.

2. The apparatus of claim 1 including an encircling clamp means engaging said second diaphragm and securing said second diaphragm within said cavity.

3. A control valve comprising:
   a valve body having an internal cavity of specified size therin;
   inlet and outlet passages through said body in communication with said cavity;
   a diaphragm of sheet material of sufficient width to extend across said cavity to divide said cavity into two portions and positioned between said inlet and outlet passages;
   a rod extending into said cavity from the exterior of said body and into an opening formed in said diaphragm, said opening fitting snuggly about said rod when said rod is in a first position to prevent fluid communication between the portions of said cavity and being distorted on manipulation of said rod to a second position whereupon the opening in said diaphragm communicates said inlet with said outlet when said rod is in the second position;
   seal means sealingly engaging said rod at a point along its length to close said cavity to leakage along said rod;
   and wherein said diaphragm is formed of resilient material and including a rigid backing member on one side thereof to position said diaphragm.

4. The structure of claim 3 wherein said rigid backing member has an opening formed therein which is at least coextensive with the opening in said diaphragm.

5. The apparatus of claim 3 wherein said rigid backing member has an opening therein coextensive with an opening in said diaphragm and extending radially in a single direction to limit motion of said rod to that single direction.

6. The apparatus of claim 3 wherein said rigid backing member has an opening therein coextensive with an opening in said diaphragm and extending radially in two directions to limit motion of said rod to two directions.

7. The apparatus of claim 3 wherein said rigid backing member has an opening therein coextensive with an opening in said diaphragm and extending radially in multi-directions to limit motion of said rod to multi-directions.

8. The apparatus of claim 3 wherein said rigid backing member has a radial extent approximately equal to said diaphragm and is clamped therewith a removable insert positioned in said valve body cavity.

9. A control valve comprising:
   a valve body having an internal cavity of specified size therein;
   inlet and outlet means in communication with said cavity in said body;
   a diaphragm of sheet material of sufficient width to extend across said cavity to divide said cavity into two portions and positioned between said inlet and outlet means;
   a rod of sufficient length to extend from said cavity;

means pivotally mounting said rod for pivotal movement thereabout at a point remote from said diaphragm;

an opening in said diaphragm with said rod extending therethrough, said diaphragm being formed of a resilient material which deforms on pivotal movement of said rod from a first position where said diaphragm encircles said rod to prevent flow between said inlet and outlet means, and a second position where said rod deforms said diaphragm to enable flow between said inlet and outlet means;

seal means engaging said rod to seal said cavity against leakage along said rod; and, means within said housing for clamping the periphery of said diaphragm in a fixed position.

10. The structure of claim 9 wherein said diaphragm is adjacent to a rigid backing member on one side thereof.

11. The apparatus of claim 10 wherein said rigid backing member has an opening therein coextensive with an opening in said diaphragm and extending radially in a single direction to limit motion of said rod to that single direction.

12. The apparatus of claim 9 wherein said seal means includes a second diaphragm with an opening therein closing said cavity at the point of entry of said rod, and means pivotally holding said rod at a pivot position to permit pivoting movement of said rod between said first and second positions.

13. The apparatus of claim 9 wherein said pivotally mounted means includes a fixed means supported by said body.

* * * * *